(12) United States Patent
Bailes

(10) Patent No.: US 7,546,974 B1
(45) Date of Patent: Jun. 16, 2009

(54) PAPER ROLL HOLDING SYSTEM

(76) Inventor: Cody S. Bailes, P.O. Box 677, Grayson, LA (US) 71435

( * ) Notice: Subject to any disclaimer, the term of this patent is extended or adjusted under 35 U.S.C. 154(b) by 0 days.

(21) Appl. No.: 12/108,006

(22) Filed: Apr. 23, 2008

(51) Int. Cl.
*B65H 16/02* (2006.01)

(52) U.S. Cl. .................. 242/588.6; 242/588; 242/404.1; 242/599.4

(58) Field of Classification Search .................. 242/398, 242/404, 404.1, 588, 588.1, 588.6, 596.8, 242/598, 598.5, 599, 599.4
See application file for complete search history.

(56) References Cited

U.S. PATENT DOCUMENTS

| | | | |
|---|---|---|---|
| 462,310 A * | 11/1891 | Gardner ................... | 242/598.5 |
| 3,258,220 A * | 6/1966 | Munger .................... | 242/404.1 |
| 3,721,395 A * | 3/1973 | Snipes ..................... | 242/596.8 |
| 3,756,652 A | 9/1973 | Trammell, Jr. | |
| 3,913,810 A | 10/1975 | Shaw | |
| 4,390,096 A * | 6/1983 | Goldenberg | |
| D322,453 S | 12/1991 | Holmberg | |
| 5,398,856 A | 3/1995 | Shyu | |
| 6,170,725 B1 | 1/2001 | Ganues | |
| 6,267,316 B1 | 7/2001 | Cross | |
| 6,824,031 B2 * | 11/2004 | McKenzie ............... | 242/588.1 |
| 7,392,921 B1 * | 7/2008 | McKenzie | |

\* cited by examiner

*Primary Examiner*—William A Rivera

(57) ABSTRACT

A paper roll holding system includes an elongated member. A strap is attached to the elongated member and is removably extendable around a headrest of the vehicle seat. A pair of arms is attached to the elongated member. The arms are oriented parallel to each other. The arms each have a distal end with respect to the elongated member. A spindle assembly is removably attached to and extends between the distal ends of the arms. The spindle assembly extends through a roll of paper to rotatably mount the roll of paper on the spindle assembly.

3 Claims, 4 Drawing Sheets

PAPER ROLL HOLDING SYSTEM

BACKGROUND OF THE INVENTION

Field of the Invention

The present invention relates to paper roll holding devices and more particularly pertains to a new paper roll holding device for holding a roll of paper towels on a vehicle seat so that the paper towels can be easily accessed while cleaning a vehicle.

SUMMARY OF THE INVENTION

The present invention meets the needs presented above by generally comprising an elongated member. A strap is attached to the elongated member and is removably extendable around a headrest of the vehicle seat. A pair of arms is attached to the elongated member. The arms are oriented parallel to each other. The arms each have a distal end with respect to the elongated member. A spindle assembly is removably attached to and extends between the distal ends of the arms. The spindle assembly extends through a roll of paper to rotatably mount the roll of paper on the spindle assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
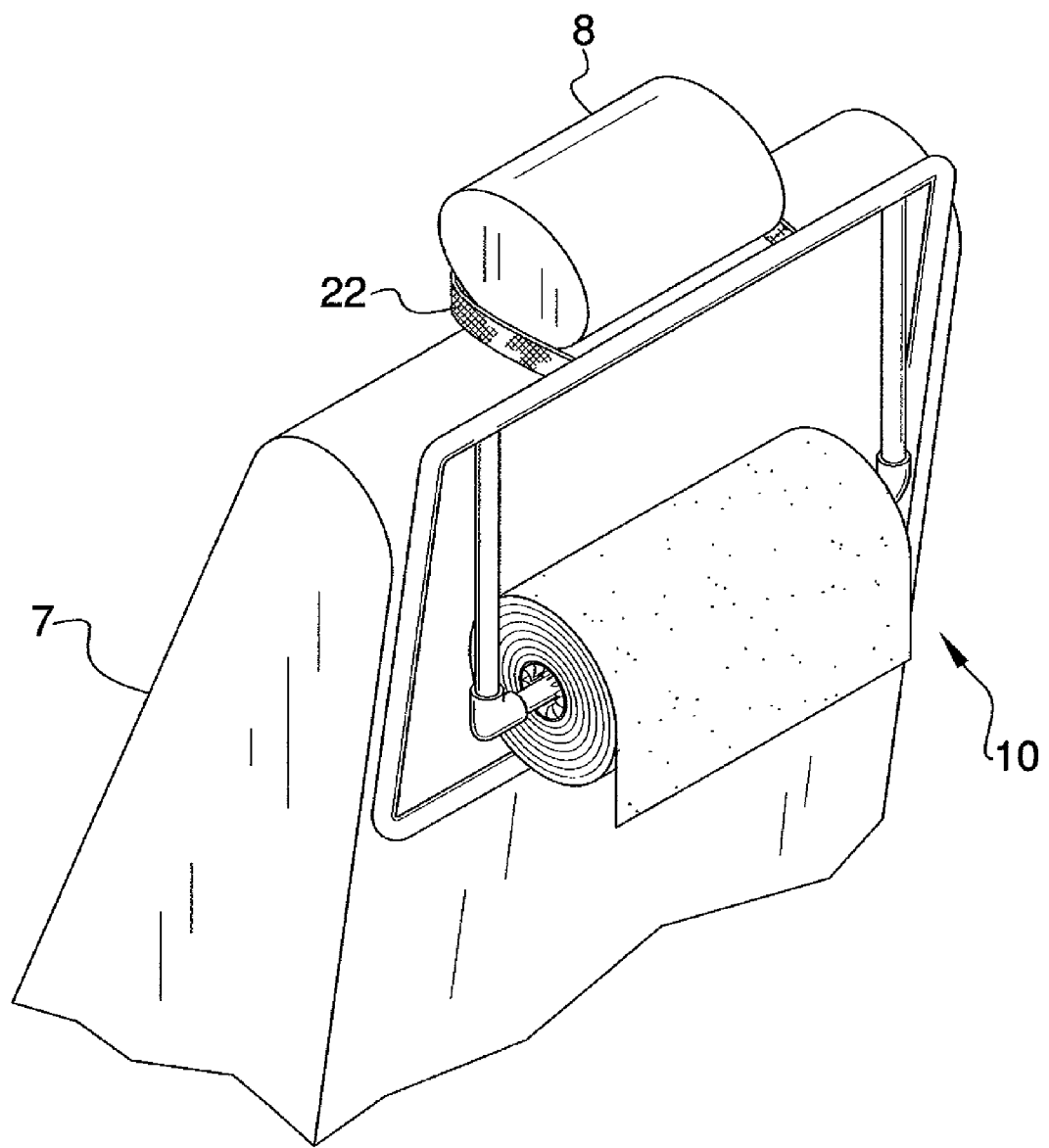
FIG. 1 is a front perspective in-use view of a paper roll holding system according to the present invention.
Figure 2:
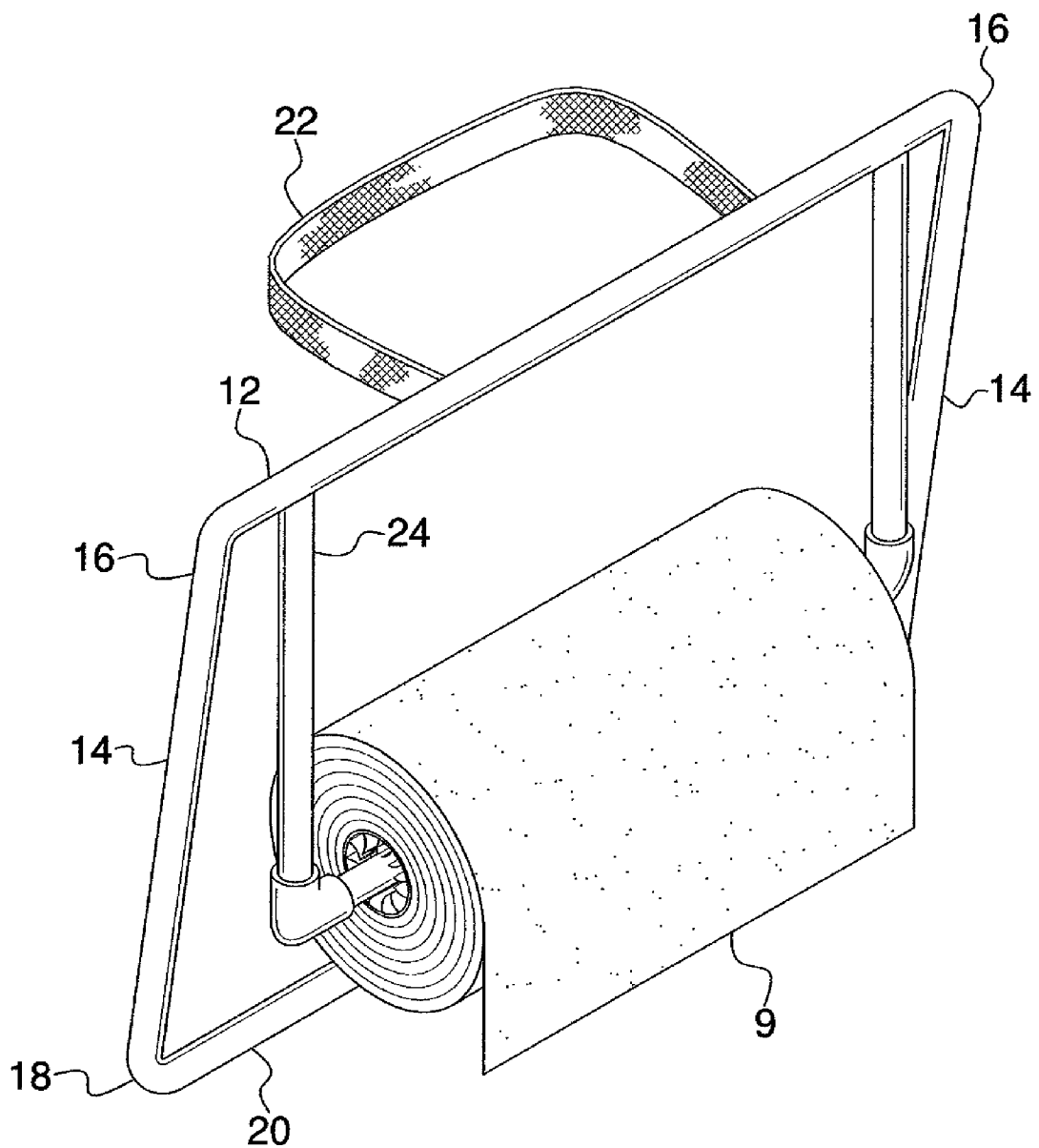
FIG. 2 is a front perspective view of the present invention.
Figure 3:
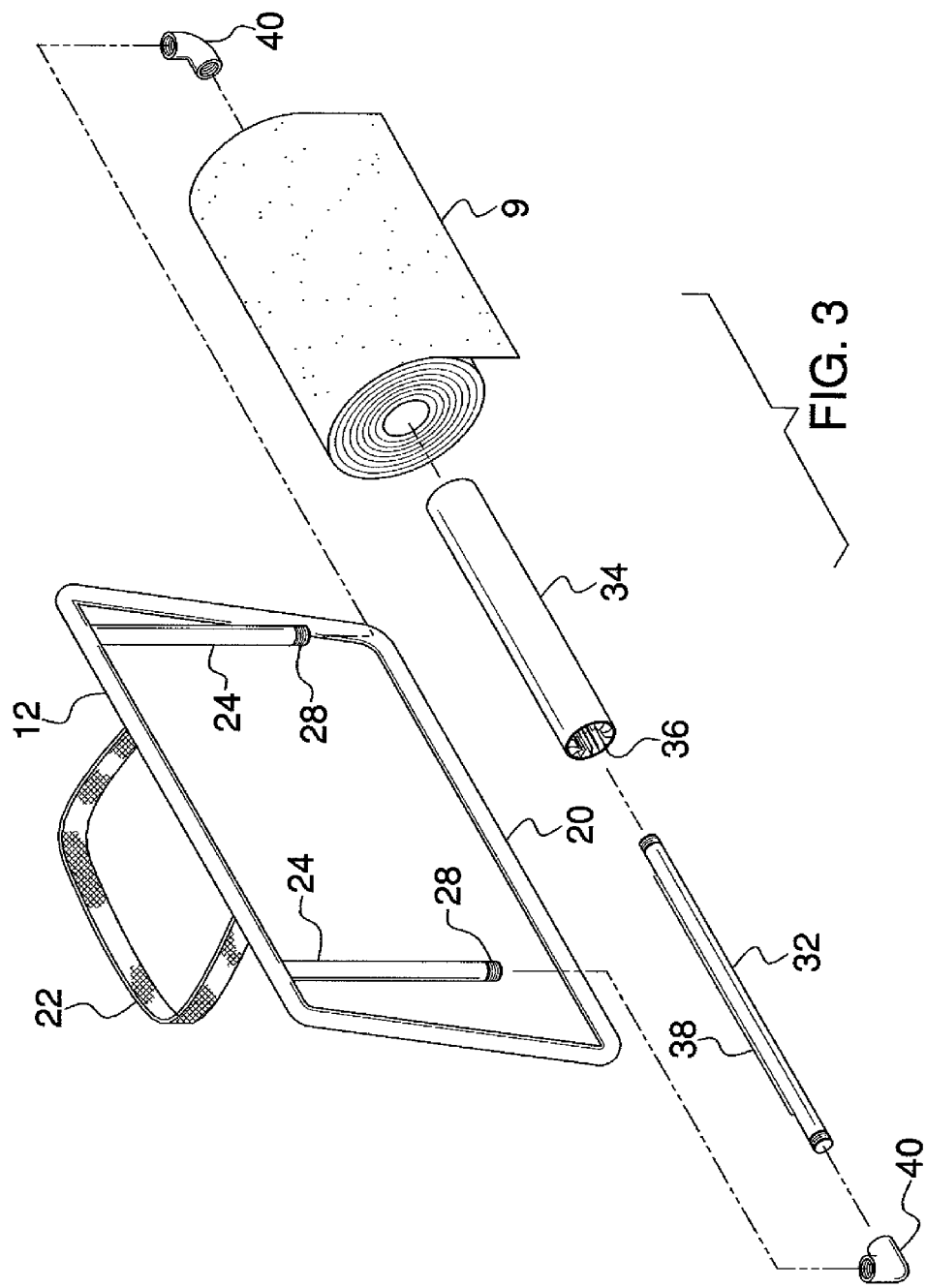
FIG. 3 is an exploded front perspective view of the present invention.
Figure 4:
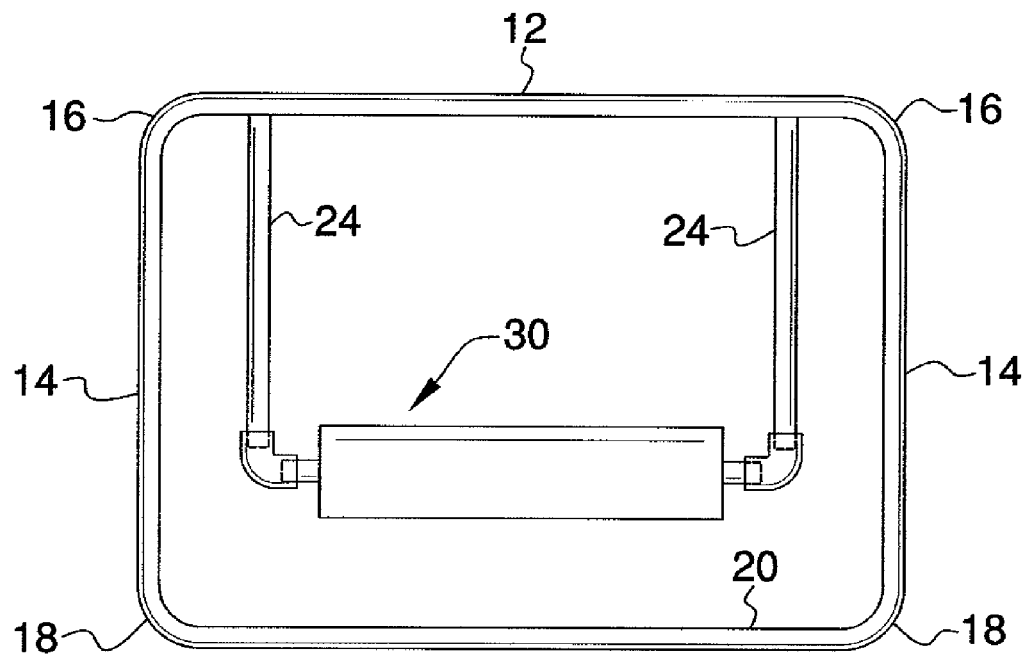
FIG. 4 is a front view of the present invention.
Figure 5:
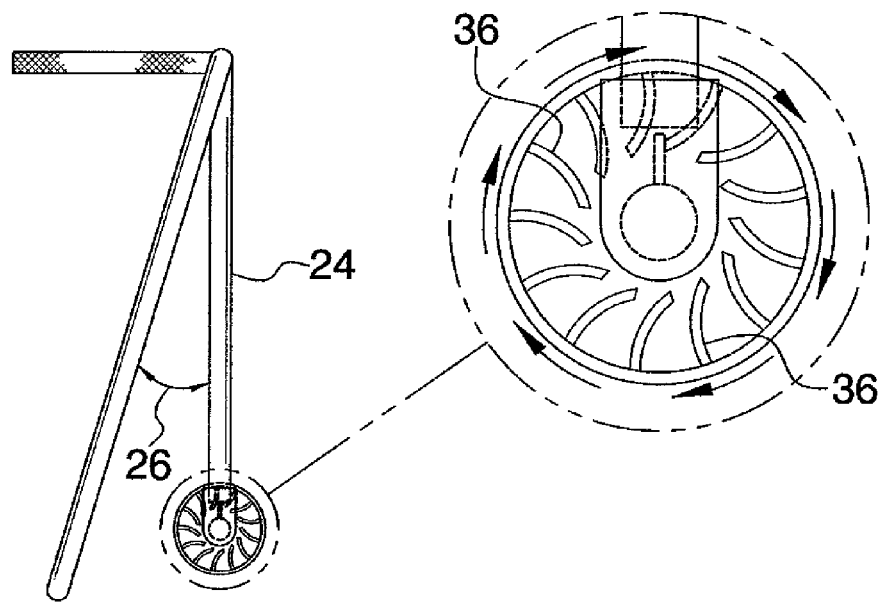
FIG. 5 is a side and enlarged view of the present invention.

With reference now to the drawings, and in particular to FIGS. 1 through 5 thereof, a new paper roll holding device embodying the principles and concepts of the present invention and generally designated by the reference numeral 10 will be described.

As best illustrated in FIGS. 1 through 5, the paper roll holding system 10 generally comprises an elongated member 12 and a pair of legs 14 each having a top end 16 and a bottom end 18. The top ends 16 each are attached to the elongated member 12. The legs 14 are oriented parallel to each other.

A strap 22 is attached to the elongated member 12. The strap 12 is removably extendable around a headrest 8 of a vehicle seat 7. The strap 12 may have a selectively adjustable length.

A pair of arms 24 is attached to the elongated member 12. The arms 24 are oriented parallel to each other and are angled outwardly from the legs 14. An angle 26 between the arms 24 and the legs 14 is between 10 degrees and 90 degrees. The arms 24 each have a distal end 28 with respect to the elongated member 12.

A spindle assembly 30 is removably attached to and extends between the distal ends 28 of the arms 24. The spindle assembly 30 extends through a roll of paper 9 to rotatably mount the roll of paper 9 on the spindle assembly 30. The spindle assembly 30 includes a rod 32 that is removably coupled to and extends between the distal ends 28. A cylinder 34 receives the rod 32. The cylinder 34 is extendable in and frictionally coupled to an inner surface of the roll of paper 9. The cylinder 34 has a plurality of flanges 36 attached thereto and extending inwardly of the cylinder 34. At least one tab 38 is attached to the rod 32. The tab 38 engages the flanges 36 when the cylinder 34 is rotated on the rod 32 to restrict free rotation of the cylinder 34 with respect to the rod 32. The rod 32 may be attached to the arms 24 using threaded female couplers 40.

In use, the cylinder 34 is extended through and frictionally coupled to the roll of paper 9. The strap 22 is then secured to the headrest 8 so that the legs 14 abut the vehicle seat 7 and the arms 14 are extended away from the vehicle seat 7. A brace 20 may be attached to and extended between the legs 14. The paper sheets may then be removed from the roll of paper 9 to be used for cleaning the interior of a vehicle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A paper roll mounting system to rotatably mount a roll of paper on a vehicle seat, said mounting system comprising:
    an elongated member;
    a strap being attached to said elongated member, said strap being removably extendable around a headrest of the vehicle seat;
    a pair of arms being attached to said elongated member, said arms being oriented parallel to each other, said arms each having a distal end with respect to said elongated member;
    a spindle assembly being removably attached to and extending between said distal ends of said arms, said spindle assembly extending through the roll of paper to rotatably mount the roll of paper on said spindle assembly; and
    a pair of legs each having a top end and a bottom end, said top ends each being attached to said elongated member, said legs being oriented parallel to each other, said arms being angled outwardly from said legs, an angle between said arms and said legs being between 10 degrees and 90 degrees.

2. A paper roll mounting system to rotatably mount a roll of paper on a vehicle seat, said mounting system comprising:
- an elongated member and a pair of legs each having a top end and a bottom end, said top ends each being attached to said elongated member, said legs being oriented parallel to each other;
- a strap being attached to said elongated member, said strap being removably extendable around a headrest of the vehicle seat;
- a pair of arms being attached to said elongated member, said arms being oriented parallel to each other, said arms being angled outwardly from said legs, an angle between said arms and said legs being between 10 degrees and 90 degrees, said arms each having a distal end with respect to said elongated member;
- a spindle assembly being removably attached to and extending between said distal ends of said arms, said spindle assembly extending through the roll of paper to rotatably mount the roll of paper on said spindle assembly, said spindle assembly including:
  - a rod being removably coupled to and extending between said distal ends; and
  - a cylinder receiving said rod, said cylinder being extendable in and frictionally coupled to an inner surface of the roll of paper, said cylinder having a plurality of flanges attached thereto and extending inwardly of said cylinder, at least one tab being attached to said rod, said tab engaging said flanges when said cylinder is rotated on said rod to restrict free rotation of said cylinder with respect to said rod.

3. A paper roll mounting system to rotatably mount a roll of paper on a vehicle seat, said mounting system comprising:
- an elongated member;
- a strap being attached to said elongated member, said strap being removably extendable around a headrest of the vehicle seat;
- a pair of arms being attached to said elongated member, said arms being oriented parallel to each other, said arms each having a distal end with respect to said elongated member;
- a spindle assembly being removably attached to and extending between said distal ends of said arms, said spindle assembly extending through the roll of paper to rotatably mount the roll of paper on said spindle assembly, said spindle assembly including:
  - a rod being removably coupled to and extending between said distal ends; and
  - a cylinder receiving said rod, said cylinder being extendable in and frictionally coupled to an inner surface of the roll of paper, said cylinder having a plurality of flanges attached thereto and extending inwardly of said cylinder, at least one tab being attached to said rod, said tab engaging said flanges when said cylinder is rotated on said rod to restrict free rotation of said cylinder with respect to said rod.

* * * * *